United States Patent [19]

Goto et al.

[11] Patent Number: 5,414,486
[45] Date of Patent: May 9, 1995

[54] CAMERA SHAKING PREVENTION DEVICE AND CAMERA SHAKING WARNING DEVICE

[75] Inventors: Tetsuro Goto, Funabashi; Kazuyuki Kazami, Tokyo; Koichi Daitoku, Sagamihara; Tsutomu Wakabayashi, Tokyo; Akira Ezawa, Tokyo; Naoki Tomino, Tokyo, all of Japan

[73] Assignee: Nikon Corporation, Tokyo, Japan

[21] Appl. No.: 128,252

[22] Filed: Sep. 28, 1993

Related U.S. Application Data

[63] Continuation of Ser. No. 15,301, Feb. 9, 1993, abandoned, which is a continuation of Ser. No. 774,174, Oct. 15, 1991, abandoned, which is a continuation of Ser. No. 593,984, Oct. 9, 1990, abandoned.

[30] Foreign Application Priority Data

Oct. 17, 1989 [JP] Japan .................................. 1-269564

[51] Int. Cl.⁶ ................................................. G03B 7/08
[52] U.S. Cl. ...................................... 354/430; 354/410
[58] Field of Search ............ 354/410, 430, 408, 289.1, 354/435, 441

[56] References Cited

U.S. PATENT DOCUMENTS

| 3,399,307 | 8/1968 | Levin ................................... 354/430 |
| 4,586,029 | 4/1986 | Tamura et al. ................... 354/289.1 |
| 4,673,276 | 6/1987 | Yoshida et al. ...................... 354/430 |
| 4,709,138 | 11/1987 | Suda et al. .......................... 354/408 |
| 4,733,264 | 3/1988 | Hatase et al. ....................... 354/430 |
| 4,901,096 | 2/1990 | Lemelson ............................ 354/430 |
| 4,959,680 | 9/1990 | Ishida et al. ......................... 354/435 |
| 4,978,981 | 12/1990 | Satah et al. ......................... 354/410 |
| 5,124,741 | 6/1992 | O'Such et al. ....................... 354/441 |

FOREIGN PATENT DOCUMENTS 55-126829 10/1980 Japan .
57-102616 6/1982 Japan .

Primary Examiner—Russell E. Adams
Attorney, Agent, or Firm—Shapiro and Shapiro

[57] ABSTRACT

There is disclosed a device for preventing the camera shaking, provided with a light metering circuit for receiving the light from an object and releasing luminance signal corresponding to the luminance of the object; a detection circuit for detecting the camera shaking at phototaking operation; a counter for counting the number of phototaking operations identified as involving camera shaking and the number of phototaking operations identified as not involving camera shaking; a discriminator for comparing the above-mentioned numbers and discriminating the relation of the numbers; and an exposure control circuit for varying the shutter time, calculated from the luminance signal, to a shorter shutter time if the count of phototaking operations identified, by the discriminator, as involving camera shaking is larger than the count of phototaking operations identified as not involving camera shaking.

13 Claims, 8 Drawing Sheets

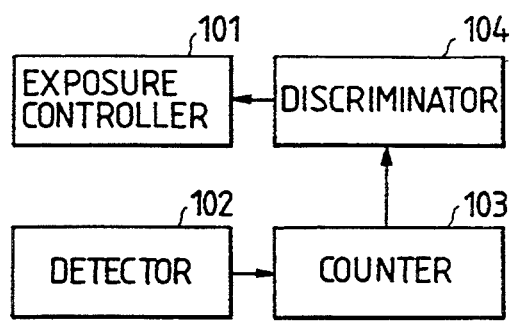
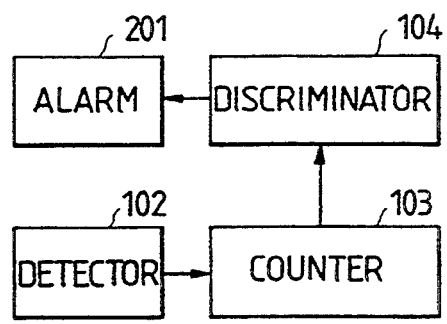
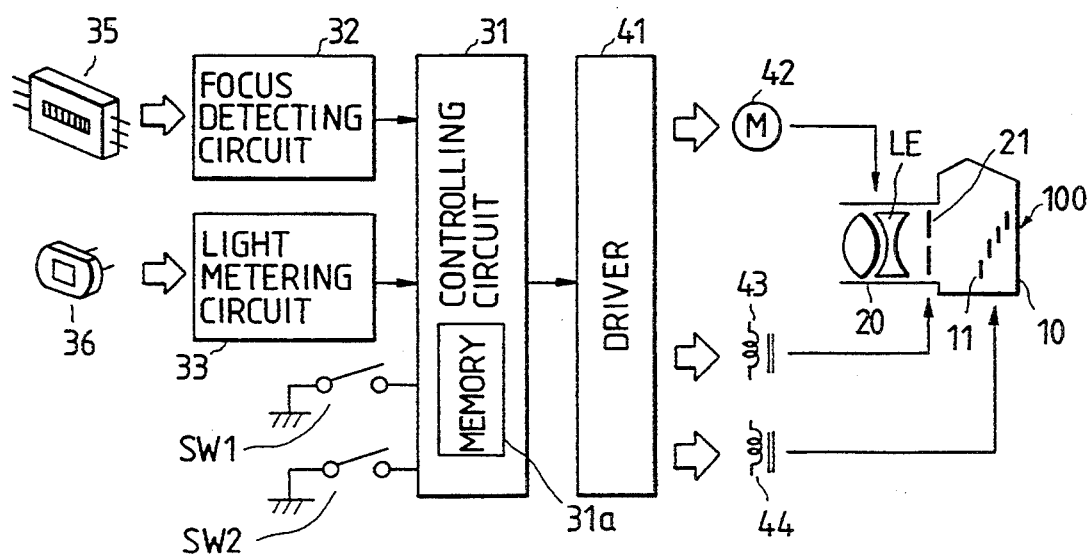

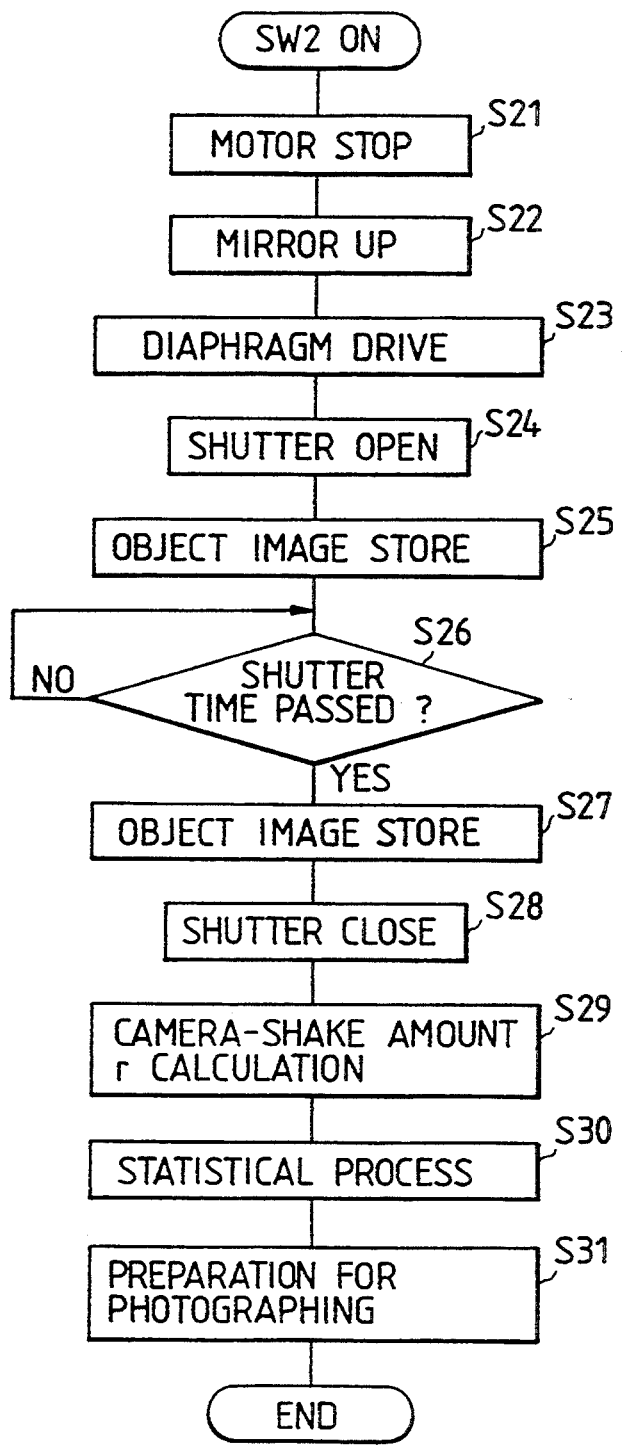

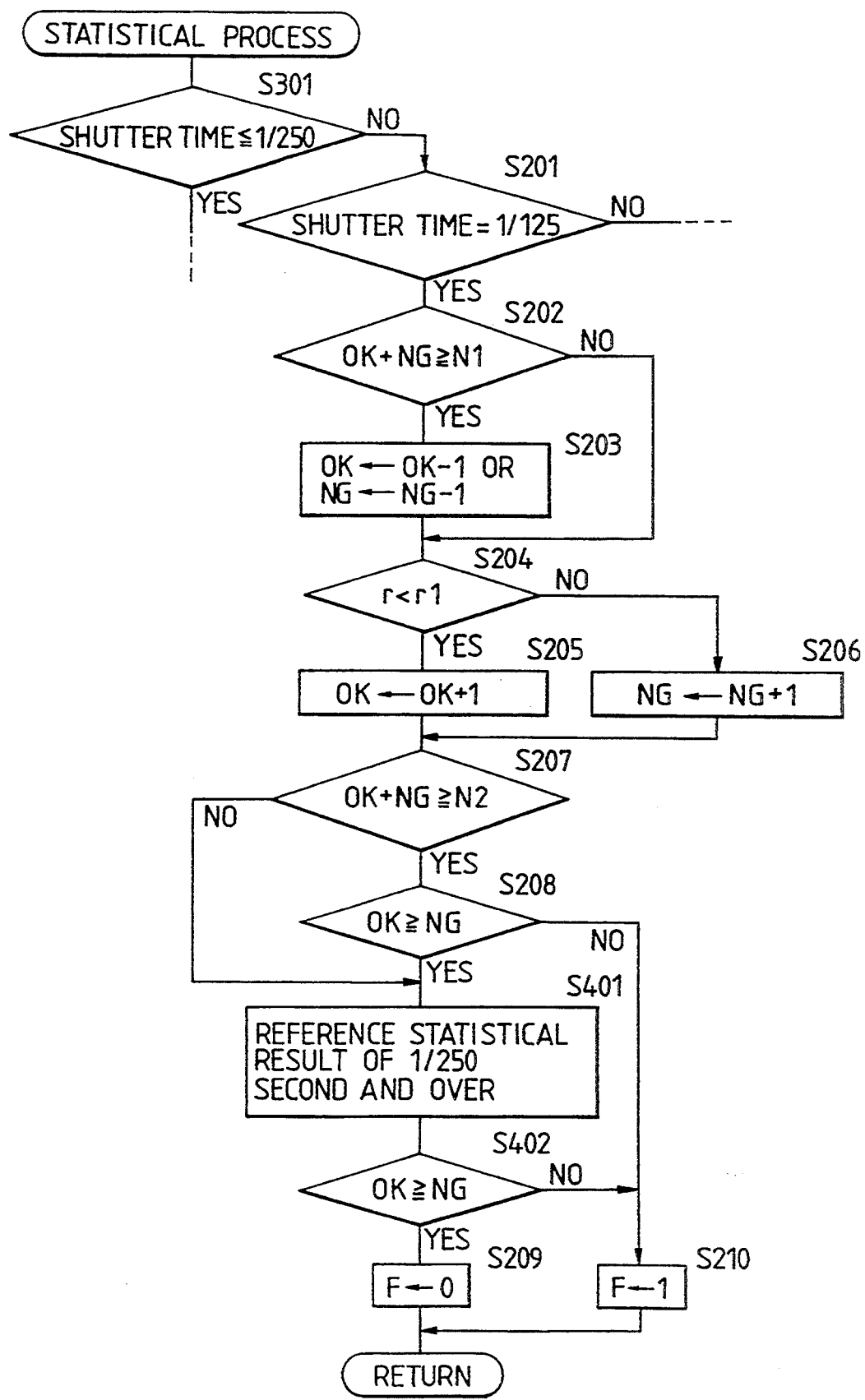

CAMERA SHAKING PREVENTION DEVICE AND CAMERA SHAKING WARNING DEVICE

This is a continuation of application Ser. No. 015,301 filed Feb. 9, 1993, which is a continuation of application Ser. No. 774,174 filed Oct. 15, 1991, which is a continuation of application Ser. No. 593,984 filed Oct. 9, 1990, all three of which are now abandoned.

BACKGROUND OF THE INVENTION

1. Field of the Invention

The present invention relates to a camera shaking preventive device and a camera shaking warning device for providing warning when camera shaking occurs.

2. Related Background Art

Among so-called automatic exposure cameras which determine the diaphragm value or shutter speed based on the luminance or the like of the object, there are known cameras capable of following preventive measure for camera shaking:

(1) detecting the presence of camera shaking at the phototaking operation and, in case of camera shaking, selecting a faster shutter speed even for the same object luminance; or (2) giving a warning to the user if the determined shutter speed is slower than a predetermined limit value for camera shaking (defined in the camera).

When a shutter speed is changed from a slower speed to a faster speed for a same object luminance, the diaphragm value has to be decreased (from a smaller aperture to a larger one) for obtaining an appropriate exposure, so taht the depth of focus is reduced. In the camera of the category (1) explained above, a faster shutter speed is automatically adopted if the camera shaking occurs even only once. Thus, even if camera shaking occurs accidentally at a shutter speed which is normally free from camera shaking, the shutter speed becomes undesirably fast, thus sacrificing the depth of focus.

On the other hand, in the camera of the category (2) explained above, because said limit value is constant, the warning may be given at a shutter speed which does not cause camera shaking for a skilled photographer, thus giving unpleasant feeling to the user.

Thus, these cameras may be inconvenient for certain users, because the camera shaking preventive measures do not take the level of skill of the user into consideration.

SUMMARY OF THE INVENTION

The object of the present invention is to appropriately vary the operating condition of the camera shaking preventive measure, according to the level of skill of the photographer.

An embodiment of the present invention, disclosed in the appended claim 1, is applicable, as shown in FIG. 1A, to a camera shaking preventive device for a camera equipped with an exposure controller 101 for determining the shutter time for phototaking operation according to the object luminance, and the above-mentioned object can be attained by a device provided with a detector 102 for detecting the camera shaking at phototaking operation, a counter 103 for counting the number of identifications of camera shaking and the number of identifications of absence of camera shaking, based on the result of detection by said detector 102, and a discriminator 104 for comparing said numbers and discriminating the relation therebetween, wherein said exposure controller 101 is constructed in the following manner.

The exposure controller 101 shifts the shutter time to a faster shutter speed, based on the object luminance and the result of discrimination by said discriminator 104, if the number of identifications of camera shaking is relatively large.

Another embodiment of the present invention disclosed in the appended claim 5, is applicable, as shown in FIG. 1B, to a camera shaking preventive device of a camera equipped with a warning device 201 for providing a warning at a predetermined shutter time, and the above-mentioned object can be attained by a device provided with the detector 102, counter 103 and discriminator 104 mentioned above, wherein said warning device 201 is constructed in the following manner.

The warning device 201 determines said predetermined shutter time, based on the result of discrimination by said discriminator 104.

In the embodiment disclosed in the claim 1, the detector 102 detects the camera shaking at the phototaking operation, and the counter 103 counts the number of identifications of camera shaking and the number of identifications of absence of camera shaking. The discriminator 104 compares said numbers and discriminates the relation thereof, and the exposure controller 101 shifts the shutter time at the phototaking operation to a faster shutter speed, based on said object luminance and the result of discrimination by said discriminator 104, if the number of identifications of camera shaking is relatively large. This embodiment prevents undesired change to a faster shutter speed in case the camera shaking accidentally occurs at a shutter speed which is normally free from camera shaking, as the change of the shutter speed is made by the statistics of the past phototaking operations.

In the embodiment disclosed in the claim 5, the warning device 201 determined the predetermined shutter speed for providing the warning for camera shaking, based on the result of discrimination by said discriminator 104. Since said predetermined shutter speed is determined by the statistics mentioned above, the warning is given at an appropriate situation according to the level of skill of the photographer, so that unpleasant feeling by unnecessary warning can be avoided.

BRIEF DESCRIPTION OF THE DRAWINGS

FIGS. 1A and 1B are schematic views of the structures respectively corresponding to claims 1 and 5;

FIGS. 2 to 8 illustrate a first embodiment of the present invention, wherein FIG. 2 is a block diagram of a camera shaking preventive device of the present invention, FIGS. 3 to 6 are flow charts of the control sequence, and FIGS. 7 and 8 are charts showing the frequency of camera shaking at different shutter times;

FIG. 9 is a flow chart of a variation;

FIGS. 10, 11A and 11B illustrate a second embodiment of the present invention; wherein FIG. 10 is a block diagram of a camera shaking warning device; and FIGS. 11A and 11B are flow charts of control sequence.

DESCRIPTION OF THE PREFERRED EMBODIMENTS

Figure 4:
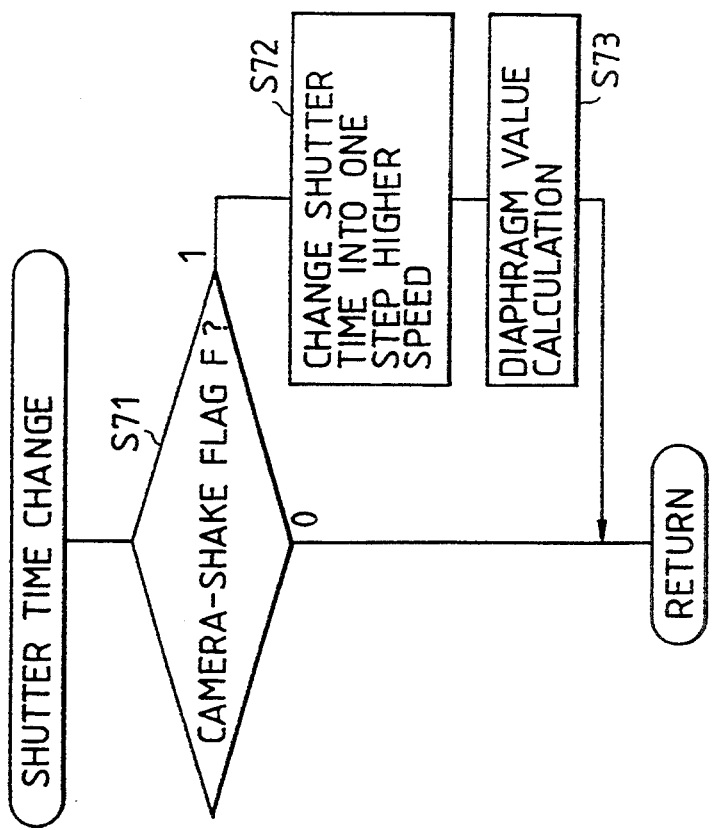

In the following there will be explained a first embodiment of the present invention, with reference to FIGS. 2 to 8.

Referring to FIG. 2 showing the entire structure, a camera 100 is composed of a camera body 10 and a phototaking lens 20. The camera body 13 is provided with a shutter 11, while the phototaking lens 20 is provided with a diaphragm 21 and a focusing optical system LE.

A control circuit 31, for controlling the sequence of the entire camera, is connected to a focus detecting circuit 32 and a light metering circuit 33. The focus detecting circuit 32 is connected to a CCD 35 serving as a focus detecting device, while the light metering circuit 33 is connected to a SPD 36 serving as a light metering device.

The CCD 35 receives the light from the object, and the focus detecting circuit 32 converts the optical image into electrical image signal for supply to the control circuit 31. Said image signal is for calculating the defocus amount and the defocus direction for moving the focusing optical system LE to an in-focus position as will be explained later, and also for calculating the amount of camera shaking at the phototaking operation. A memory 31a is provided for storing the image signal of said object image, for the purpose of calculating the amount of camera shaking.

A part of the light coming from the object and passing through the phototaking lens 20 is received by the diode 36 and converted into electrical signal (luminance signal), corresponding to the luminance of the object, by the light metering circuit 33, for supply to the control circuit 31. Based on said luminance signal, the control circuit 31 calculates the exposure value (diaphragm stop value and the shutter time).

The control circuit 31 is connected to a driver 41 and switches SW1, SW2, and said driver 41 is connected to a focusing motor 42, a solenoid 43 for driving the diaphragm 21, and a solenoid 44 for driving the shutter 11. The switches SW1, SW2 are respectively closed by a half-stroke depression and a full-stroke depression of an unrepresented shutter release button.

The control circuit 31 executes a phototaking sequence to be explained later in response to the closing of the switches SW1, SW2, and also identifies the presence or absence of camera shaking at the phototaking operation, statistically processes the number of such identifications and varies the shutter time according to the result of said statistical processing.

In the following explained is the control sequence of the control circuit 31, with reference to flow charts shown in FIGS. 3 to 6.

Figure 3:
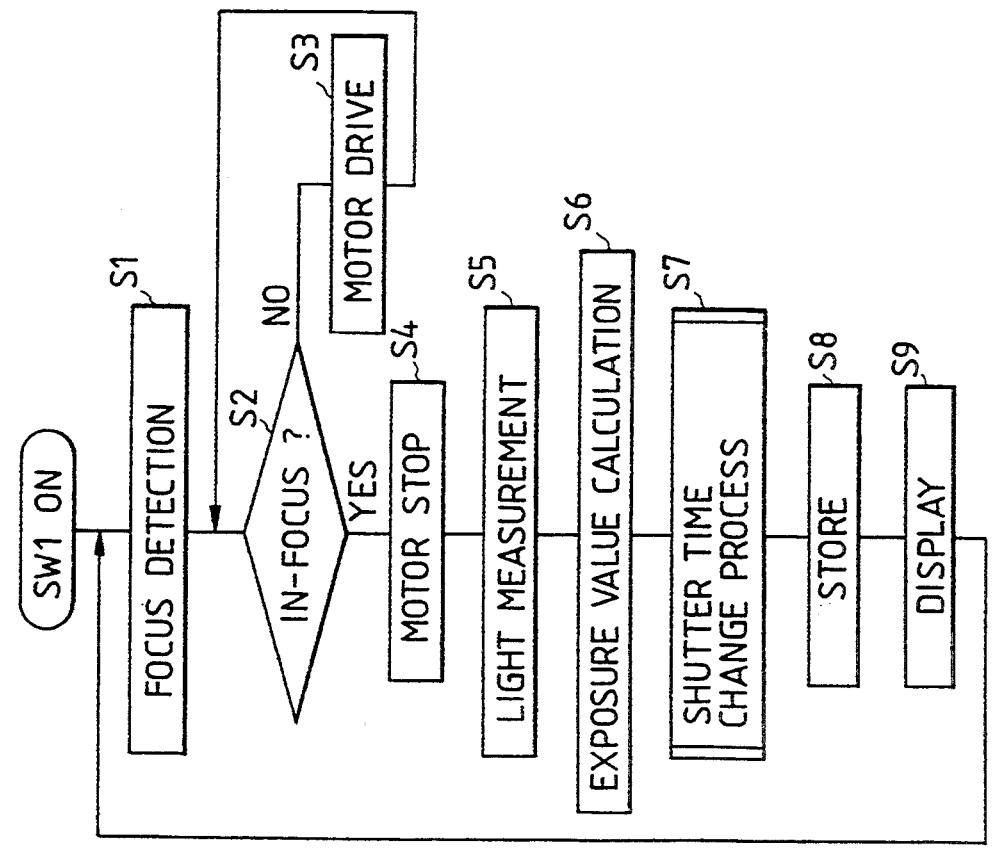

FIG. 3 shows the sequence when the switch SW1 is closed by a half-stroke depression of the shutter release button. In response to the closing of said switch SW1, a program corresponding to said sequence is activated, and at first a step S1 effects a focusing operation. More specifically, the image signal, corresponding to the object image focused on the CCD 35 and converted by the focus detecting circuit 32, is fetched, and a known calculation of defocus amount is conducted based on said image signal, thereby determining the amount and direction of aberration between the image plane of the phototaking lens 20 and the estimated image plane, namely the defocus amount and the defocus direction.

Then a step S2 discriminates whether the focusing optical system LE is in the predetermined in-focus position, namely whether the focusing optical system LE is in a position corresponding to the defocus amount and defocus direction mentioned above, for example based on the output of an unrepresented lens encoder. If not, a step S3 supplies the driver 41 with a lens drive signal for moving the focusing optical system 41 in said defocus direction, and the sequence returns to the step S2. In response to said lens drive signal, the driver 41 activates the motor 42 thereby moving the focusing optical system LE in said defocus direction. On the other hand, if the discrimination of the step S2 turns out affirmative, a step S4 stops the motor 42 and the sequence proceeds to a step S5.

The step S5 fetches the luminance signal corresponding to the object luminance, by activating the light metering circuit 33, and a step S6 calculates the exposure value (diaphragm stop value and shutter time) for obtaining an appropriate exposure, from said luminance signal and the film sensitivity entered from an unrepresented sensitivity detecting circuit.

A next step S7, for varying the shutter time, is more detailedly shown in FIG. 4. At first a step S71 discriminates whether a camera shaking flag F is "0" or "1", as will be explained later If it is "0", the sequence returns to the sequence shown in FIG. 3. If it is "1", a step S72 selects a shutter time which is one step faster than the shutter time obtained in the step S6. More specifically, if the shutter time selected in the step S6 is 1/60 seconds, there is selected 1/125 seconds. Then a step S73 calculates a new diaphragm stop value (one step closer to the full-open aperture) for obtaining an appropriate exposure with the newly selected shutter time, and the sequence returns to the sequence shown in FIG. 3.

A step S8 in FIG. 3 stores the exposure value (diaphragm stop value and shutter time) calculated in the step S6 or modified in the step S7 in the memory 31a, and a step S9 causes an unrepresented display unit to display said exposure value. Then the sequence returns to the step S1, and the above-explained sequence is repeated while the half-stroke depression of the shutter release button continues. The sequence is terminated when said depression is released.

When the shutter release button is depressed over the full stroke in succession to the half-stroke depression of said button, the switch SW2 is closed to activate, by an interruption, a shutter release routine shown in FIG. 5. At first, in a step S21, the control circuit 31 stops the motor 42 whereby the focusing optical system LE stops regardless whether it is in the in-focus position or not. Then a step S22 elevates an unrepresented mirror, and a step S23 drives the solenoid 43 through the driver 41, thereby driving the diaphragm 21 to the stop value obtained in the step S6 or S7 in FIG. 3. Then a step S24 drives the solenoid 44 through the driver 41, thereby opening the shutter 11.

A step S25 activates the focus detecting circuit 32 and the CCD 35, and stores the obtained image signal of the object image in the memory 31a. Then a step S26 discriminates whether the shutter time, determined in the step S6 or S7, has elapsed since the opening of the shutter in the step S24. If not, the sequence waits until affirmative discrimination is obtained, and proceeds to a step S27 when affirmative discrimination is obtained.

The step S27 again activates the focus detecting circuit 32 and the CCD 35 to store the image signal of the object image in the memory 31a, and a step S28 closes the shutter. Then a step S29 calculates the amount r of camera shaking, from two object images stores in the steps S25 and S28. In the presence of camera shaking, the object image at the shutter opening is different from that at the shutter closing, and the camera shaking amount r can be calculated from said difference. There-after the sequence proceeds to a step S30 for statistical processing.

Figure 6:
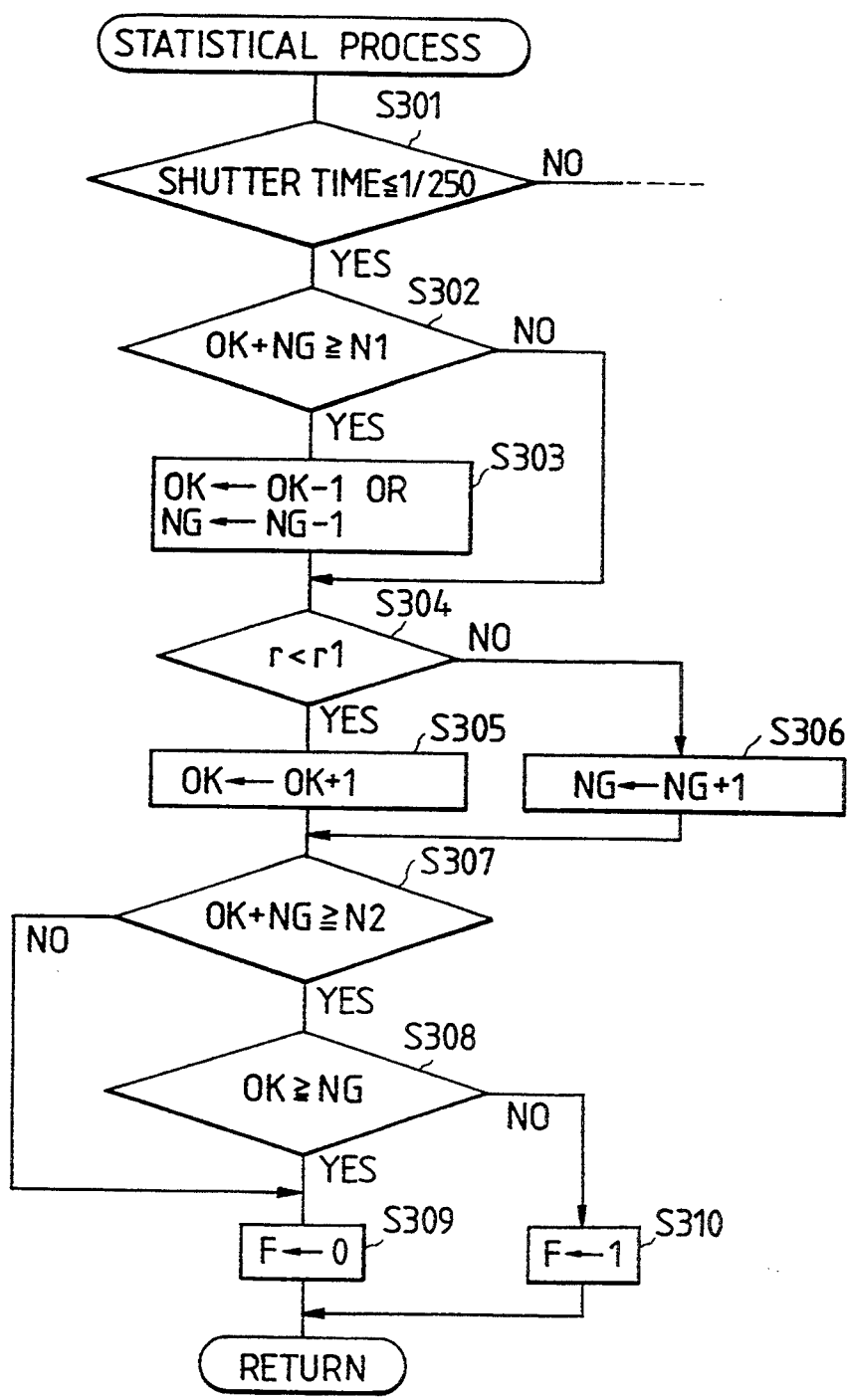

FIG. 6 shows the details of said statistical processing, in which a step S301 discriminates whether the shutter time determined in the step S6 or S7 in FIG. 3 is equal to or shorter than 1/250 seconds. The present embodiment executes following statistical processing for each of a shutter time of $\leq 1/250$ seconds, 1/60 seconds, 1/30 seconds and $\geq 1/15$ seconds, but the sequence starting from a step S302 in FIG. 6 shows a case of shutter time equal to or shorter than 1/250 seconds.

If the discrimination of the step S301 turns out affirmative, a step S302 discriminates whether the sum of counts OK and NG has exceeded a predetermined number N1. The count OK indicates the number of phototaking operations without camera shaking while the count NG is the number of phototaking operations with camera shaking, both counts being set at zero at the manufacture of the camera.

If the discrimination of the step S302 turns out negative, the sequence proceeds to a step S304, but, if it is affirmative, a step S303 step decreases the variable OK or NG. Thus the control circuit 31 memorizes the presence or absence of camera shaking at each phototaking operation, and, when the sum of the counts OK, NG exceeds the predetermined value N1, the oldest count OK or NG is deleted. This is achieved by the use of N1 memory units serially connected. When a latest signal is entered into one of said N1 memory units, previously entered signals are shifted to other memory units, and the signal stored in the N1-th memory unit is deleted. Consequently the sum of the counts OK and NG does not exceed N1 regardless of the total number of phototaking operations.

A step S304 then discriminates whether the camera shaking amount r, detected in the step S29 is less than a predetermined reference value r1. In the present embodiment, the camera shaking is identified as present or absent respectively when the camera shaking amount is equal to or larger than the reference value r1, or is smaller than said reference value r1.

If the step S304 provides affirmative discrimination, indicating the absence of camera shaking, a step S305 increases the count OK by "+1". On the other hand, if the step S304 provides a negative discrimination, indicating the presence of camera shaking, a step S306 increases the count NG by "+1".

Then a step S307 discriminates whether the sum of the counts OK and NG has reached a predetermined value N2, which is smaller than N1. If not, the sequence proceeds to a step S309, but, if said value N2 is reached, a step S308 compares the counts OK and NG. If OK$\geq$NG, a step S309 sets the camera shaking flag F as "0", but, if OK<NG, a step S310 sets said flag F as "1", and then the sequence returns to the flow in FIG. 5.

A step S31 in FIG. 5 executes preparations for the next phototaking operation such as opening of the diaphragm 21, descent of the mirror and winding of the film, and the sequence is then terminated.

According to the above-explained sequence in FIG. 6, presence or absence of camera shaking is discriminated at each phototaking operation with a shutter time equal to or shorter than 1/250 seconds, and the count OK or NG is increased according to the result of said discrimination. After the sum of the counts OK, NG reaches the predetermined value N2, said counts are always compared mutually, and the camera shaking flag F is set as "1" if the count NG indicating the number of phototaking operations with camera shaking is larger, or as "0" if the count OK if the count OK indicating the number of phototaking operations without camera shaking is larger.

Figure 7:
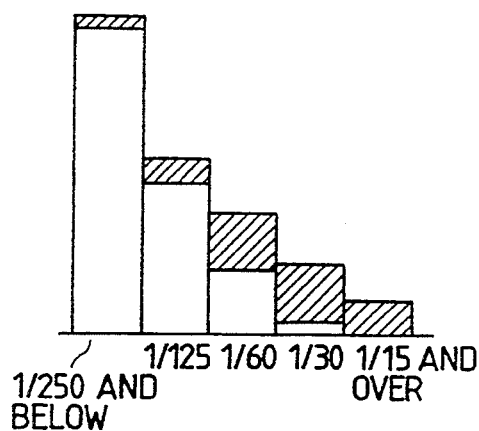

This process is also conducted for each of other shutter times in a similar manner, and the counts OK, NG for each shutter time are stored in the memory. FIG. 7 shows an example of thus obtained results.

In FIG. 7, the abscissa indicates different shutter times, while the ordinate indicates the breakdown of the counts OK and NG, respectively by blank portions and hatched portions. FIG. 7 shows a general case, in which the number of phototaking operations is larger as the shutter time is shorter, and the camera shaking is scarce at 1/250 seconds or shorter. The camera shaking becomes more frequent as the shutter time becomes longer, and occurs in all phototaking operations at 1/15 seconds or longer.

Figure 8:
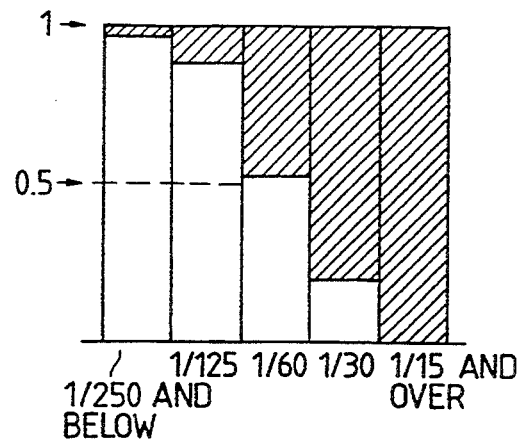

FIG. 8 shows the probability of OK and NG at each shutter time, when the number of phototaking operations in FIG. 7 is normalized to unity. FIG. 8 indicates that the probability of OK is slightly higher than that of NG at 1/60 seconds, and that the probability of OK is larger at shorter shutter times and that of NG is larger at longer shutter times. In this example, therefore, the flag F is set as "0" for shutter times equal to or shorter than 1/60 seconds, and as "1" for shutter times longer than 1/60 seconds.

When the camera shaking flag F is "1", the shutter time calcualted on the object luminance at the next half-stroke depression of the shutter release button (closing of the switch SW1) is changed to a shorter time, and a phototaking operation with thus changed shutter time is conducted by a succeeding full-stroke depression (closing of the switch SW2). Consequently, starting from the next phototaking operation, there is obtained a higher probability of preventing the camera shaking.

As explained in the foregoing, the present embodiment exactly determines, based on the statistics of past phototaking operations, the probability of camera shaking at each shutter time according to the level of skill of the photographer, and the shutter time is changed to a shorter time if the frequency of camera shaking is high. Consequently if camera shaking has occurred at a shutter time which is normally free from camera shaking, the shutter time at the next phototaking operation is not undesirably changed to a shorter shutter time, whereby unnecessary sacrifice of the depth of focus can be prevented.

Also in the present embodiment, the statistical processing is always conducted on latest data, since once the sum of counts OK and NG exceeds the predetermined value N1, the oldest count OK or NG is deleted at each phototaking operation. Therefore shorter shutter times are initially selected when the photographer is not used to the camera, but the shutter time becomes longer with the improvement in the skill of the photographer, for example by a firmer method of camera holding, so that the phototaking operation can be executed without sacrificing the depth of focus even when the object is somewhat dark.

In the above-explained embodiment, the control circuit 31 constitutes the exposure control circuit 101, counter 103 and discriminator 104, while the focus detecting circuit 32 and the CCD 35 constitute the detector 102.

FIG. 9 shows a variation of the statistical process, in which, even when the camera shaking is absent at a certain shutter time (1/125 seconds in this case) but is present at another shutter time which is one-step shorter, the camera shaking is identified present also in the first-mentioned shutter time.

Referring to FIG. 9, if the step S301 (same as that in FIG. 6) provides negative result, a step S201 discriminates whether the shutter time is 1/125 seconds, and, if affirmative, steps S202–S208 execute a process same as that of the steps S302–S308 explained above. If the step S208 provides an affirmative result, the sequence proceeds to a step S401 for referring to the statistical result of the shutter of 1/250 seconds or shorter, as in FIG. 6. Then a step S402 compares the counts OK and NG in FIG. 6, and, if OK≧NG, a step S209 sets the camera shaking flag F as "0", but, if OK<NG, a step S210 sets the camera shaking flag F as "1".

For example, if the number of phototaking operations at 1/125 seconds is very limited, the statistical processing may provide a result OK>NG even though the camera shaking is apt to occur in practice. Therefore reference is made to the statistical result at 1/250 seconds which is a step shorter, and, if OK<NG, the camera shaking flag F is set at "1" even if OK>NG at 1/125 seconds. Thus the statistical result becomes closer to the reality, and the camera shaking preventive ability can be improved by varying the shutter time based on said statistical result.

In the system shown in FIG. 5, the amount of camera shaking is determined from the results of focus detection immediately after the opening of the shutter and immediately after the closing thereof. However, for example in a camera employing TTL phase difference detection method in which the focus detection is conducted by receiving the light passing through the phototaking lens 20, the amount of camera shaking has to be determined from the results of focus detection immediately before the mirror ascent and immediately after the mirror descent, because the light from the object cannot be received while the mirror is lifted.

In the following there will be explained a second embodiment of the present invention, with reference to FIGS. 10 and 11.

Figure 10:
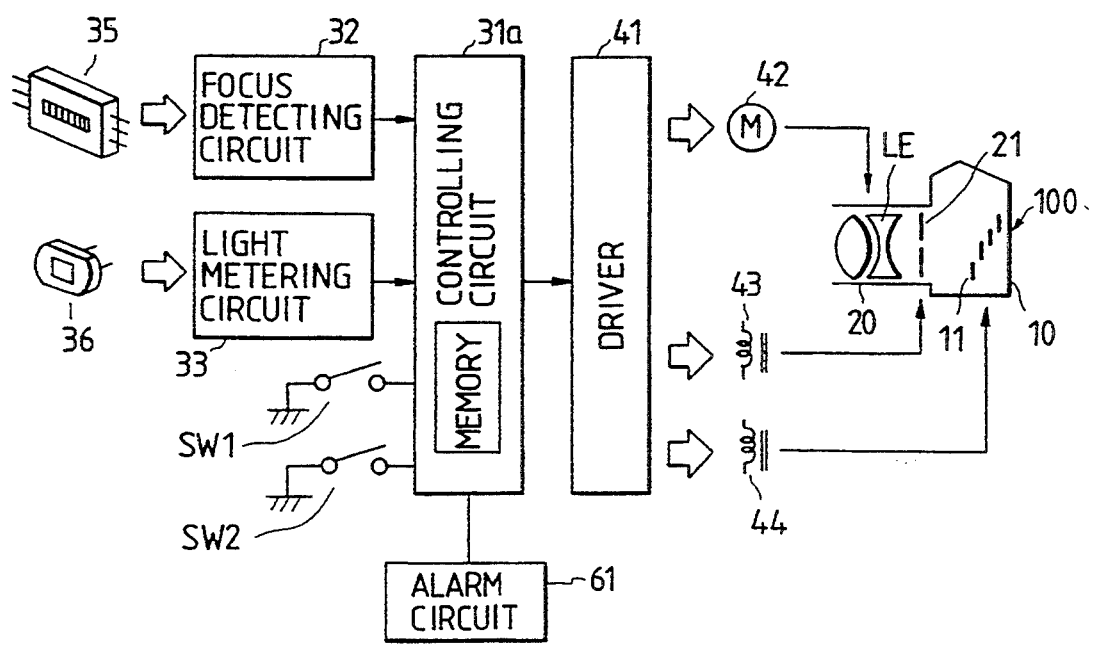

The entire structure shown in FIG. 10 is similar to that shown in FIG. 2, except for a control circuit 31a and an alarm circuit 61 connected thereto. Said alarm circuit 61 provides, in response to an alarm signal from the control circuit 31a, alarm for camera shaking for example by lighting or flashing a light-emitting diode in the view finder.

Figure 11B:
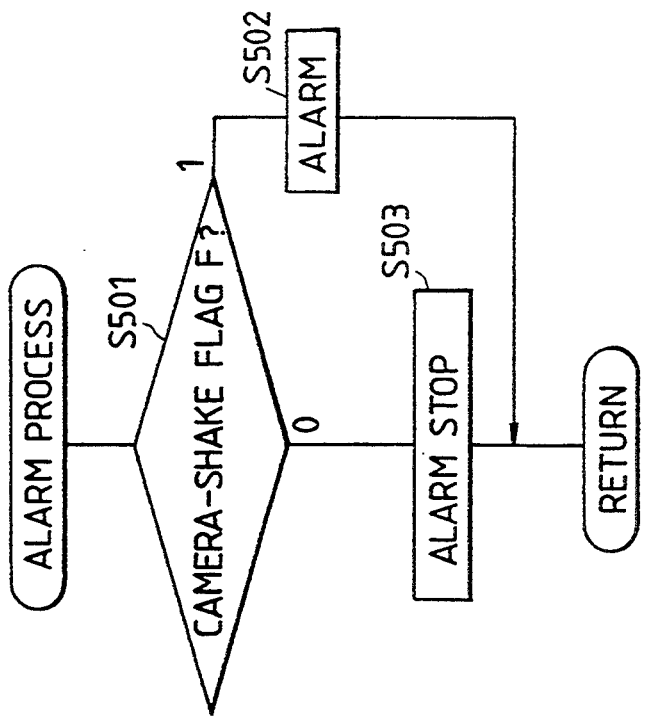
Figure 11A:
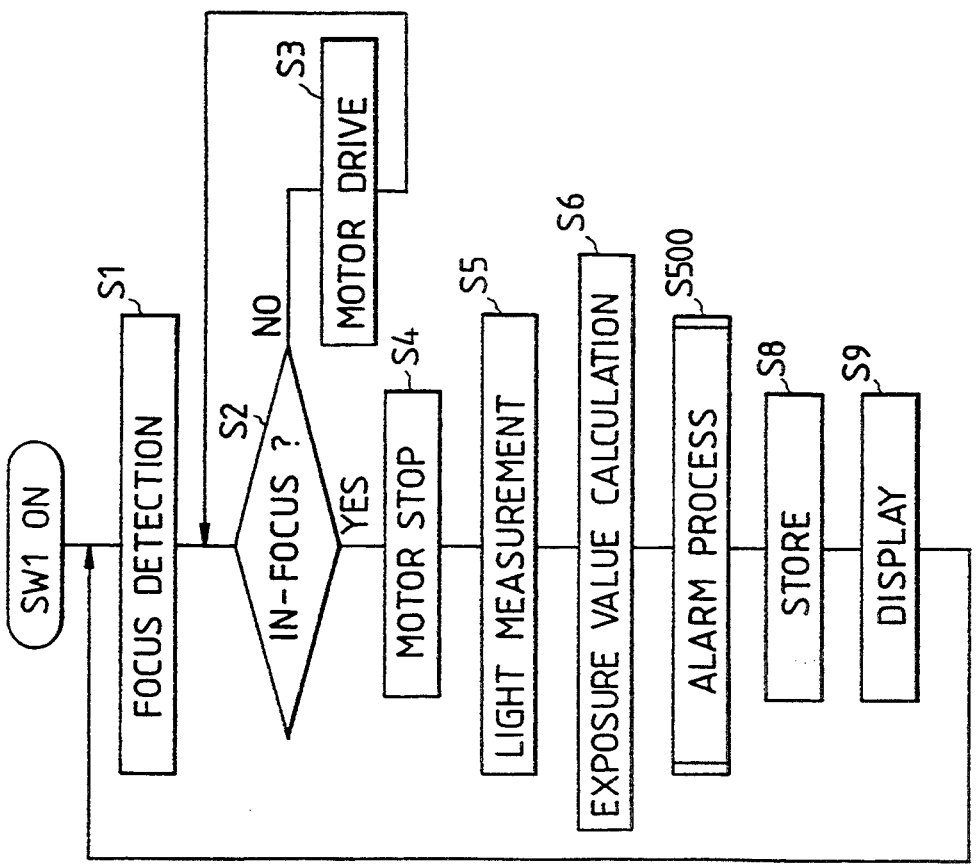

FIG. 11A shows the control sequence of the control circuit 31a. When said sequence is activated by the closing of the half-stroke switch SW1, there are at first executed the steps S1–S6 explained in FIG. 3. Subsequently a step S500 executes an alarm process, and, after the steps S8 and S9, the sequence returns to the step S1. Also the process in response to the closing of the full-stroke switch SW2 and the statistical process are same as those explained in relation to FIGS. 5 and 6.

FIG. 11B shows the detials of the alarm process of the step S500. At first a step S501 discriminates the state of the camera shaking flag F. If it is "1", the above-explained camera shaking alarm is given in the view finder through the alarm circuit 61, but, if it is "0", the alarm is terminated. Also said alarm is terminated also when the switch SW2 is closed.

In the above-explained sequence, the camera shaking alarm is given to the photographer in case said camera shaking flag F is "1", namely if the probability of camera shaking is high (count NG is larger than count OK) at the shutter time determined from the object luminance. As explained in the foregoing, the present embodiment exactly determines the shutter time of appearance of camera shaking, based on the statistics of past phototaking operations and according to the level of skill of the photographer and gives the alarm at said shutter time. Consequently the alarm is always given when the probability of camera shaking is present, but unnecessary alarm is not given when the probability of camera shaking is absent, so that the photographer is relieved from unpleasant feeling.

The alarm may be given acoustically instead of the light-emitting diode in the view finder.

Figure 12:
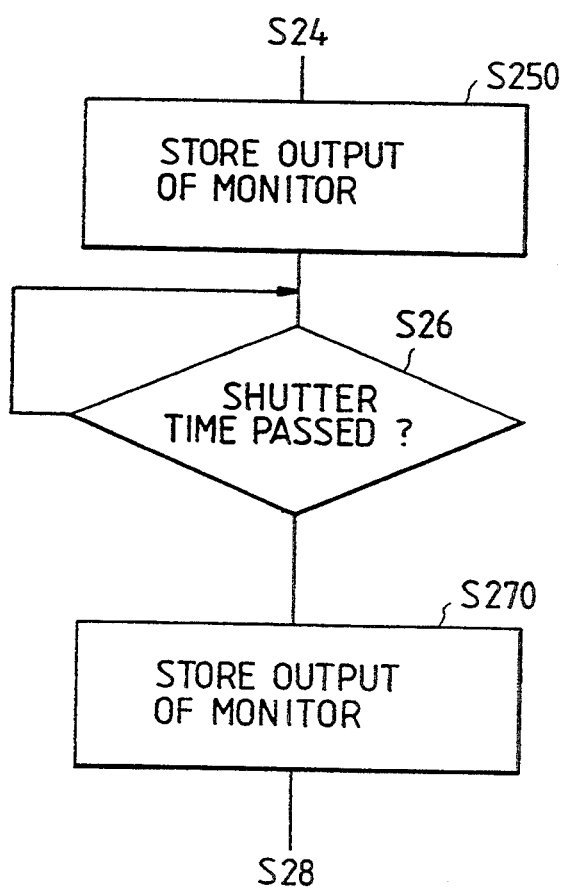
FIG. 12 is a flow chart of a third embodiment.

In the foregoing embodiments, the camera shaking is detected by the output of the focus detecting circuit 32. However the camera shaking may also be detected by a device disclosed in the Japanese Patent Application Laid-open No. 55-126829 in which the vibration of an element resulting from camera shaking is converted into signal by a magnet and a yoke or a device disclosed in the Japanese Patent Application Laid-open No. 57-102616 utilizing flicker signal of the light metering device. In the following there will be explained a third embodiment utilizing such devices as a monitor, with reference to a flow chart shown in FIG. 12. Said third embodiment is different from the sequence shown in FIG. 5, in steps S250 and S270 shown in FIG. 12. In the third embodiment, the sequence is same as that in FIG. 5 up to the step S25. The step S250 reads and stores the output of a monitor as disclosed in the two prior arts explained above. After the step S26, the step S270 again reads and stores the output of said monitor. The step S28 closes the shutter, and the step S29 calculates the camera shaking amount based on the outputs, stored in the steps S250 and S270, of the monitor. In a single-lens reflex camera utilizing TTL light metering, the flicker signal of the light metering device is detected immediately before the mirror ascent and immediately after the mirror descent.

What is claimed is:

1. A camera shaking preventive device, comprising:
    light metering means for receiving light from an object and releasing a luminance signal corresponding to the luminance of the object;
    detection means for detecting camera shaking at a phototaking operation;
    counter means for counting a number of phototaking operations identified as involving camera shaking and a number of phototaking operations identified as not involving camera shaking, based on the result of detection by said detection means;
    discrimination means for comparing the results of said counting and identifying a relation thereof; and
    exposure control means for varying a shutter time, calculated from said luminance signal, to a shorter time if the number of phototaking operations identified as involving camera shaking is larger than the number of phototaking operations identified as not involving camera shaking, based on the result of discrimination by said discrimination means.

2. A device according to claim 1, wherein said counter means is adapted to delete the oldest count at each phototaking operation, once the sum of the number of phototaking operations in which said camera shaking is identified as at least equal to a predetermined level and the number of phototaking operations in which said camera shaking is less than said predetermined level reaches a predetermined number.

3. A device according to claim 1, wherein said exposure control means is adapted, if the number of phototaking operations identified as involving camera shaking does not exceed the number of phototaking operations identified as not involving camera shaking, to compare another number of phototaking operations identified as involving camera shaking with another number of phototaking operations identified as not involving camera shaking at another shorter shutter time, and to vary the shutter time, calculated from said luminance signal to a shorter shutter time in case said another number of phototaking operations identified as involving camera shaking is larger.

4. A device according to claim 1, wherein said detection means includes a detection device for receiving the light from the object and releasing an image signal of said object; memory means for storing image signals immediately after the opening of the shutter and immediately before the closing of the shutter; calculation means for calculating the amount of camera shaking based on said image signals; and discrimination means for discriminating the presence or absence of camera shaking by comparing said amount of camera shaking with a predetermined value.

5. A camera shaking alarm device comprising:
detection means for detecting camera shaking at a phototaking operation;
counter means for counting a number of phototaking operations identified as involving camera shaking and a number of phototaking operations identified as not involving camera shaking, based on the result of detection by said detection means;
discrimination means for comparing the results of said counting and discriminating a relation thereof; and
alarm means for determining a shutter time at which an alarm for camera shaking is to be given, based on the result of discrimination by said discrimination means, and providing the alarm for camera shaking when said shutter time is selected.

6. A camera comprising:
light metering means for receiving light from an object and producing a luminance signal corresponding to the luminance of the object;
exposure means for performing an exposure operation;
detecting means for detecting camera shaking at a phototaking operation;
counter means for counting a number of phototaking operations identified as involving camera shaking and a number of phototaking operations identified as not involving camera shaking, based on the result of detection by said detecting means;
discriminating means for comparing the results of said counting and producing a discriminating signal on the basis of the result of the comparison; and
control means responsive to said discriminating signal for controlling said exposure means.

7. A camera according to claim 6, wherein said exposure means has shutter means for driving a shutter, and wherein said control means controls said shutter means on the basis of said discriminating signal.

8. A camera comprising:
detecting means for detecting camera shaking at a phototaking operation;
counter means for counting a number of phototaking operations identified as involving camera shaking and a number of phototaking operations identified as not involving camera shaking, based on the result of detection by said detecting means;
discriminating means for comparing the results of said counting and producing a discriminating signal on the basis of the result of the comparison; and
display means for displaying on the basis of said discriminating signal.

9. A camera comprising:
detecting means for detecting camera shaking at a phototaking operation;
counter means for counting a number of phototaking operations identified as involving camera shaking and a number of phototaking operations identified as not involving camera shaking, based on the result of detection by said detecting means; and
discriminating means for comparing the results of said counting and producing a discriminating signal on the basis of the result of the comparison.

10. A camera comprising:
a silicon photodiode receiving light from an object;
a light metering circuit producing a luminance signal corresponding to the luminance of the object on the basis of an output of said silicon photodiode;
an exposure control circuit performing an exposure operation on the basis of said luminance signal;
a charge coupled device producing an image signal;
a detection circuit detecting camera shaking at a phototaking operation on the basis of said image signal;
a counter circuit counting a number of phototaking operations identified as involving camera shaking and a number of phototaking operations identified as not involving camera shaking, based on the result of detection by said detection circuit;
a discrimination circuit comparing the results of said counting to produce a discriminating signal on the basis of the result of the comparison; and
a control circuit responsive to said discriminating signal to control said exposure control circuit.

11. A camera according to claim 10, wherein said exposure control circuit has a shutter driving device driving a shutter, and wherein said control circuit controls said shutter driving device on the basis of said discriminating circuit.

12. A camera comprising:
a charge coupled device producing an image signal;
a detection circuit detecting camera shaking at a phototaking operation on the basis of said image signal;
a counter circuit counting a number of phototaking operations identified as involving camera shaking and a number of phototaking operations identified as not involving camera shaking, based on the result of detection by said detection circuit;
a discrimination circuit comparing the results of said counting to produce a discriminating signal on the basis of the result of the comparison; and
a display unit displaying on the basis of said discriminating signal.

13. A camera comprising:
a charge coupled device producing an image signal;

a detection circuit detecting camera shaking at a phototaking operation on the basis of said image signal;

a counter circuit counting a number of phototaking operations identified as involving camera shaking and a number of phototaking operations identified as not involving camera shaking, based on the result of detection by said detection circuit; and a discrimination circuit comparing the results of said counting to produce a discriminating signal on the basis of the result of the comparison.

* * * * *